(12) United States Patent
Hirota et al.

(10) Patent No.: US 6,755,291 B2
(45) Date of Patent: Jun. 29, 2004

(54) WET-TYPE FRICTION CLUTCH AND ELECTROMAGNETIC FRICTION CLUTCH

(75) Inventors: Isao Hirota, Tochigi (JP); Yoshihisa Miyata, Tochigi (JP); Tatsuki Shimura, Amagasaki (JP)

(73) Assignees: Tochigi Fuji Sangyo Kabushiki Kaisha, Tochigi-ken (JP); Tokuhatsu Co., Ltd., Hyogo-ken (JP)

(*) Notice: Subject to any disclaimer, the term of this patent is extended or adjusted under 35 U.S.C. 154(b) by 0 days.

(21) Appl. No.: 10/272,805

(22) Filed: Oct. 17, 2002

(65) Prior Publication Data
US 2003/0106758 A1 Jun. 12, 2003

(30) Foreign Application Priority Data

Oct. 23, 2001 (JP) ......................................... 2001-325698

(51) Int. Cl.[7] ........................ F16D 69/00; F16D 27/115; F16D 13/64
(52) U.S. Cl. .................... 192/35; 192/70.12; 192/70.14; 192/84.7; 192/84.91; 192/107 R; 192/113.36
(58) Field of Search ........................... 192/70.12, 70.14, 192/113.36, 107 R, 35, 84.7, 84.91

(56) References Cited

U.S. PATENT DOCUMENTS

| | | | | |
|---|---|---|---|---|
| 2,779,175 A | * | 1/1957 | LeHew | 464/46 |
| 3,073,424 A | * | 1/1963 | Russell | 192/113.36 |
| 5,671,835 A | * | 9/1997 | Tanaka et al. | 192/107 R |
| 6,158,561 A | * | 12/2000 | Sakai et al. | 192/35 |

FOREIGN PATENT DOCUMENTS

| | | | | |
|---|---|---|---|---|
| JP | 01-145438 A | | 6/1989 | |
| JP | 11-208303 A | | 8/1999 | |
| JP | 2002-213485 A | * | 7/2002 | F16D/13/62 |

* cited by examiner

Primary Examiner—Richard M. Lorence
(74) Attorney, Agent, or Firm—Jordan and Hamburg LLP (57) ABSTRACT

A wet-type friction clutch plate which keeps lubricant on a frictional slide face, stabilizes frictional torque transmission and suppresses shuddering noise. The wet-type friction clutch plate has the frictional slide face on which a grid of grooves is formed. The frictional slide face frictionally engages with an opposite clutch plate. At least one of the sectional shape and plan shape of each of the grooves is configured to provide the frictional slide face with a $\mu$-v characteristic such that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate.

22 Claims, 6 Drawing Sheets

WET-TYPE FRICTION CLUTCH AND ELECTROMAGNETIC FRICTION CLUTCH

BACKGROUND OF THE INVENTION

1. Field of the Invention

The present invention relates to a wet-type friction clutch plate achieving frictional engagement between frictional slide faces to transmit torque between rotary members.

2. Description of the Related Art

An example of a wet-type friction clutch plate is in a power transmission device disclosed in Japanese Patent Laid Open Publication No. 11-208303.

The power transmission device is installed on, for example, a propeller shaft of a 4WD (four-wheel drive) vehicle. Between an outer rotary member on the propeller shaft and an inner rotary member on a drive pinion shaft, wet-type friction clutch plates are arranged to engage in a rotation direction. When the clutch plates receive axial thrust and the propeller shaft and drive pinion shaft rotate relative to each other, the clutch plates frictionally engage with each other to transmit torque between the shafts.

A space between the outer and inner rotary members is sealed to contain lubricant and accommodate the clutch plates. The lubricant maintains lubrication between the clutch plates.

An example of a wet-type friction clutch plate applicable to the power transmission device is disclosed in Japanese Patent Laid Open Publication No. 01-145438. This clutch plate has a grid of grooves on a frictional slide face to secure engagement and prevent detrimental slippage. The grooves keep lubricant within them while maintaining the drainage thereof.

Simply forming such a grid of grooves on a frictional slide face of a wet-type friction clutch plate, however, reduces friction only to some extent, destabilizes torque transmission, and sometimes produces excessive torque. To cope with such excessive torque, reinforced parts must be employed in the power transmission device, thereby increasing the size and weight of the device. In addition, the grooves cause shuddering noise when clutch plates slide on each other.

The wet-type friction clutch plate has a $\mu$-v characteristic, wherein $\mu$ is a coefficient of friction on a frictional slide face of the clutch plate and v is a relative rotational speed of the clutch plate relative to an opposite clutch plate that slides on the clutch plate in question. When $\mu$ increases with an increase in v, it is a positive $\mu$-v inclination, and when $\mu$ decreases with an increase in v, it is a negative $\mu$-v inclination. The negative $\mu$-v inclination causes self-excited vibration, destabilizes torque transmission, and produces shuddering noise.

In this way, simply forming a grid of grooves on a frictional slide face of a wet-type friction clutch plate causes various problems.

SUMMARY OF THE INVENTION

An object of the present invention is to provide a wet-type friction clutch plate capable of stably transmitting torque and preventing shuddering noise.

A first aspect of the present invention provides a wet-type friction clutch plate having a grid of grooves formed on a frictional slide face that frictionally engages with an opposite clutch plate. At least one of the sectional shape and plan shape of each of the grooves is configured to provide the frictional slide face with a $\mu$-v characteristic that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate.

A second aspect of the present invention provides each of the grooves of the first aspect with a wedge-shaped cross section.

A third aspect of the present invention provides each of the grooves of the second aspect with a V-shaped cross section having symmetrically inclined side walls.

A fourth aspect of the present invention provides each of the grooves of any one of the first to third aspects with a cross section having a curve between each groove side wall and the frictional slide face.

A fifth aspect of the present invention provides each intersection of the grooves of any one of the first to third aspects with a cross section having a curve between each side wall of the intersection and the frictional slide face.

A sixth aspect of the present invention provides each intersection of the grooves of any one of the first to third aspects with rounded corners in a plan view to widen the area of the intersection.

A seventh aspect of the present invention sets the depth of the grooves of any one of the first to third aspects in a range of 0.004 mm to 0.03 mm.

An eighth aspect of the present invention forms the grooves of any one of the first to third aspects by pressing the frictional slide face with the depth of the grooves set in a range of 0.004 mm to 0.03 mm in a radially intermediate area on the frictional slide face.

A ninth aspect of the present invention provides an electromagnetic friction clutch employing the wet-type friction clutch plate of any one of the first to eighth aspects. The electromagnetic friction clutch includes inner and outer rotary members coaxially arranged to rotate relative to each other, a main clutch interposed between the inner and outer rotary members to increase and decrease frictional engagement in response to axial thrust and transmit torque between the inner and outer rotary members through the frictional engagement when the inner and outer rotary members rotate relative to each other, a pilot clutch to achieve frictional engagement in response to electrically controlled electromagnetic force, and a converter acting on the frictional engagement of the pilot clutch, to convert the frictional engagement into thrust to the main clutch. At least one of the main clutch and pilot clutch employs the wet-type friction clutch plate of any one of the first to eighth aspects.

The first aspect forms a grid of grooves on a frictional slide face of a wet-type friction clutch plate that frictionally engages with an opposite clutch plate. At least one of the sectional shape and plan shape of each of the grooves is configured to provide the frictional slide face with a $\mu$-v characteristic that $\mu$ increases with an increase in v to prevent self-excited vibration during frictional engagement of the wet-type friction clutch plate with the opposite clutch plate, wherein $\mu$, is a coefficient of friction on the frictional slide face and v is a relative rotational speed of the wet-type friction clutch plate relative to the opposite clutch plate. The first aspect stabilizes torque transmission between the wet-type friction clutch plate and the opposite clutch plate and prevents shuddering noise.

In addition to the effects of the first aspect, the second aspect provides each of the grooves with a wedge-shaped cross section. Lubricant in the grooves produces fluid pressure due to a wedge action to smoothly move onto the frictional slide face and increase a lubricant film thickness between the wet-type friction clutch plate and the opposite clutch plate. The second aspect reduces a time lag in a clutch residual torque diminishing period.

The grooves include those oriented in a rotation direction of the clutch plate and those oriented in a direction orthogonal to the rotation direction. If the grooves orthogonal to the rotation direction have sharp edges, they will damage the opposite clutch plate. Providing the grooves with wedge-shaped cross sections is helpful to form an obtuse angle between a side wall of each groove and the frictional slide face, thereby eliminating sharp edges from the grooves and preventing the damage of the opposite clutch plate.

In addition to the effects of the second aspect, the third aspect provides each of the grooves with a V-shaped cross section having symmetrically inclined side walls. The third aspect realizes the effects of the second aspect on each side wall of the grooves.

In addition to the effects of the first to third aspects, the fourth aspect provides each of the grooves with a cross section having a curve between each groove side wall and the frictional slide face. The fourth aspect prevents the damage of the opposite clutch plate, smoothly passes lubricant, maintains a uniform lubricant film thickness, and suppresses a stick-slip phenomenon.

The curves at the grooves prevent the damage of groove edges during a surface hardening process that employs, for example, a polishing process such as shot peening or shot blasting or barrel polishing to remove an oxide film from the frictional slide face.

In addition to the effects of the first to third aspects, the fifth aspect provides each intersection of the grooves with a cross section having a curve between each side wall of the intersection and the frictional slide face. The fifth aspect prevents the damage of the opposite clutch plate, smoothly passes lubricant, maintains a uniform lubricant film thickness, and suppresses a stick-slip phenomenon.

The curves at the groove intersections prevent the damage of intersection edges during a surface hardening process to remove an oxide film.

In addition to the effects of the first to third aspects, the sixth aspect provides each intersection of the grooves with rounded corners in a plan view to widen the area of the intersection and sufficiently maintain lubricant at the intersection.

In addition to the effects of the first to third aspects, the seventh aspect sets the depth of the grooves in a range of 0.004 mm to 0.03 mm, to sufficiently maintain lubrication on the frictional slide face.

The seventh aspect secures fine pitches and fine frictional slide areas among the grooves, to smoothly transmit torque through frictional engagement and prevent shuddering noise.

In an electromagnetic friction clutch employing the wet-type friction clutch plates each of the seventh aspect driven by electrically controlled electromagnetic force, the grooves shallower than 0.03 mm secure magnetic lines of force to provide a required electromagnetic force. If the grooves are too deep, they increase a clutch-to-clutch space, to block magnetic lines of force. The grooves shallower than 0.03 mm stabilize magnetic attraction and realize sufficient frictional engagement.

The grooves having wedge- or V-shaped cross sections of fixed opening angles reduce frictional slide areas as the depth of the grooves increases. The grooves shallower than 0.03 mm maintain proper frictional slide areas to secure proper frictional engagement.

In addition to the effects of the first to third aspects, the eighth aspect forms the grooves by pressing the frictional slide face with the depth of the grooves set in a range of 0.004 mm to 0.03 mm in a radially intermediate area on the frictional slide face. At the location where the grooves tend to become shallower during pressing, the eighth aspect secures the depth of the grooves within the range of 0.004 mm to 0.03 mm, so that all grooves on the frictional slide face may secure the depth of 0.004 mm to 0.03 mm. The eighth aspect easily controls the depth of the grooves.

In addition to the effects of the first to eighth aspects, the ninth aspect provides an electromagnetic friction clutch employing the wet-type friction clutch plate of any one of the first to eighth aspects. The electromagnetic friction clutch includes inner and outer rotary members coaxially arranged to rotate relative to each other, a main clutch interposed between the inner and outer rotary members to increase and decrease frictional engagement in response to axial thrust and transmit torque between the inner and outer rotary members through the frictional engagement when the inner and outer rotary members rotate relative to each other, a pilot clutch to achieve frictional engagement in response to electrically controlled electromagnetic force, and a converter acting on the frictional engagement of the pilot clutch, to convert the frictional engagement into thrust to the main clutch. At least one of the main clutch and pilot clutch employs the wet-type friction clutch plate of any one of the first to eighth aspects.

When the pilot clutch employs the wet-type friction clutch plate, it shows a good transient characteristic of torque transmission with respect to current ON/OFF operations and minimizes magnetic flux variations under a predetermined current value. The grooves on the clutch plate block magnetic lines of force at a current OFF operation.

When the main clutch employs the wet-type friction clutch plate, it improves the response of the main clutch with respect to a change in transmitted torque or a change in a torque transmission direction. Namely, the wet-type friction clutch plate improves the torque transmission response of the main clutch with respect to the engagement of the pilot clutch that is changed by controlling a current. It also improves the torque transmission OFF response of the main clutch when a control current to the pilot clutch is cut. These effects prevent shuddering noise in the main clutch.

DETAILED DESCRIPTION OF EMBODIMENTS

Figure 1:
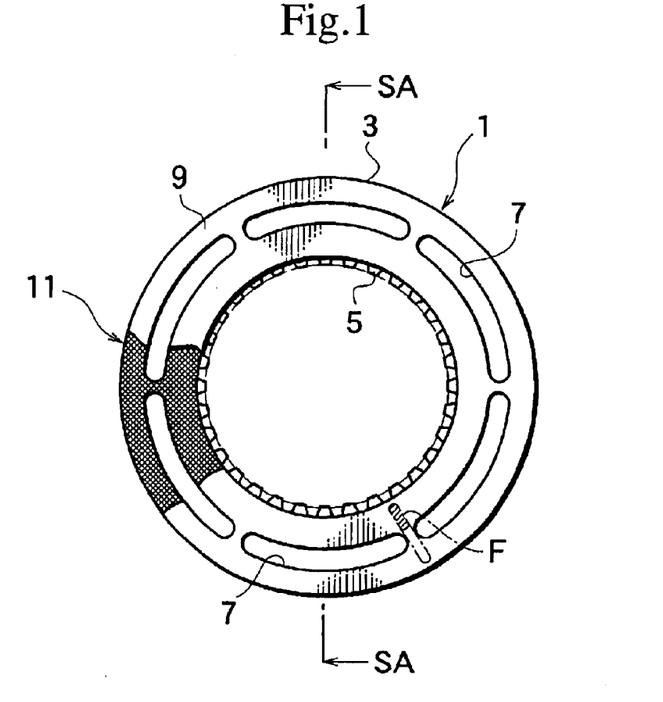
FIG. 1 is a front view showing a wet-type friction clutch plate according to an embodiment of the present invention.
Figure 2:
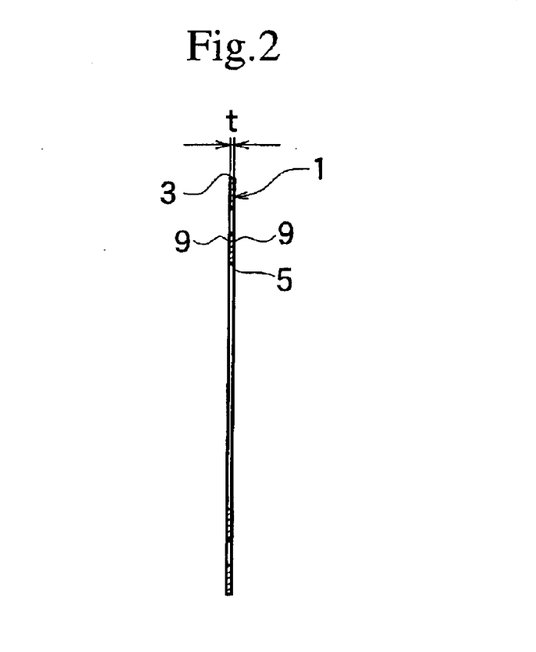
FIG. 2 is a sectional view taken along a line SA—SA of FIG. 1.
Figure 3:
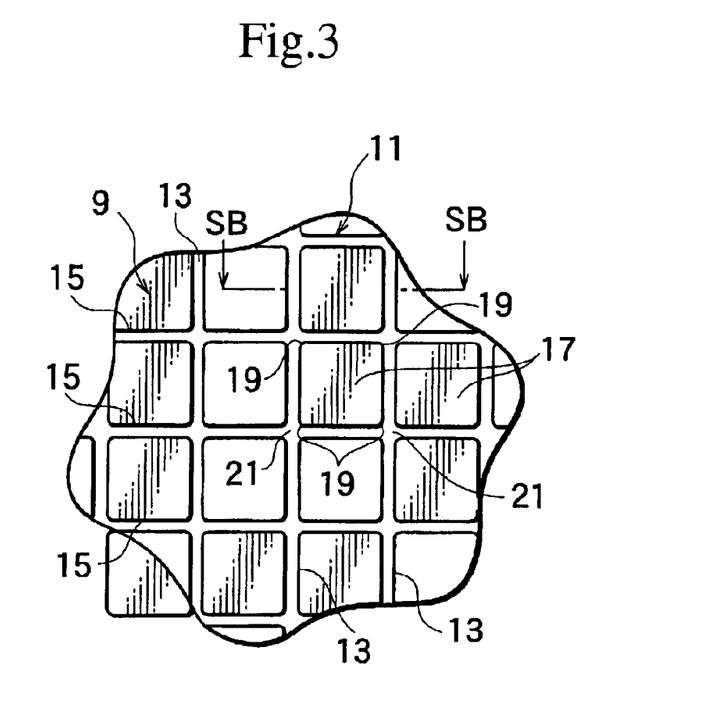
FIG. 3 is an enlarged view partly showing a frictional slide face of the clutch plate of FIG. 1.
Figure 4:
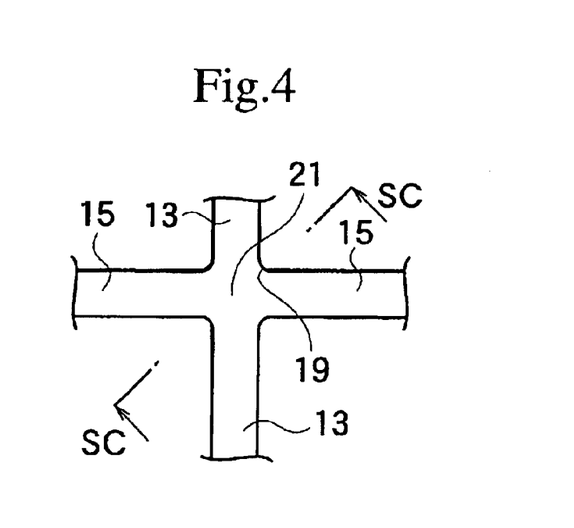
FIG. 4 is an enlarged view showing a groove intersection on the frictional slide face of FIG. 3.
Figure 5:
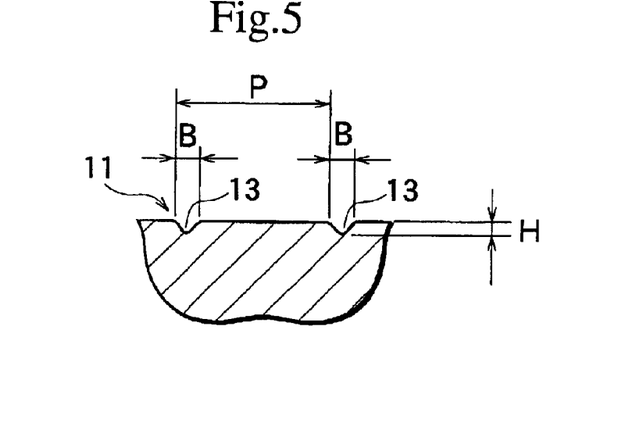
FIG. 5 is a sectional view taken along a line SB—SB of FIG. 3.
Figure 6A:
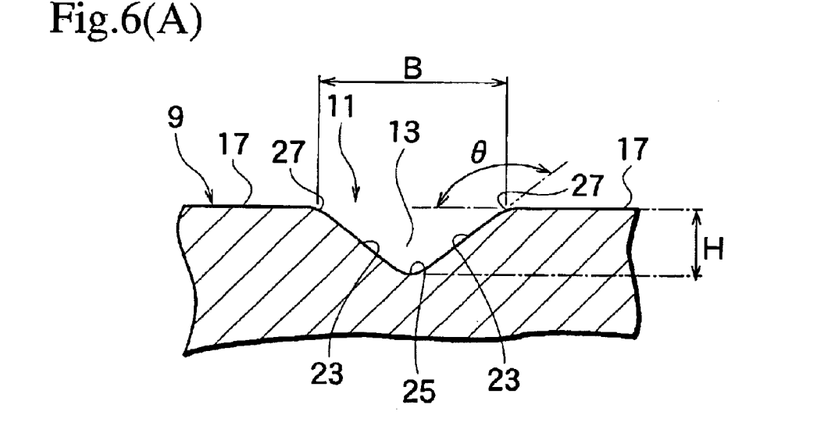
FIG. 6A is an enlarged sectional view showing a groove of FIG. 5.
Figure 6B:
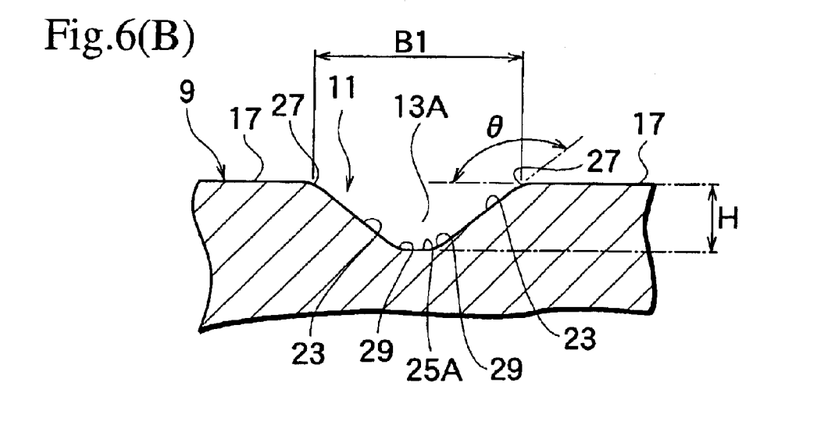
FIG. 6B is an enlarged sectional view showing a groove modified from the groove of FIG. 6A.
Figure 7:
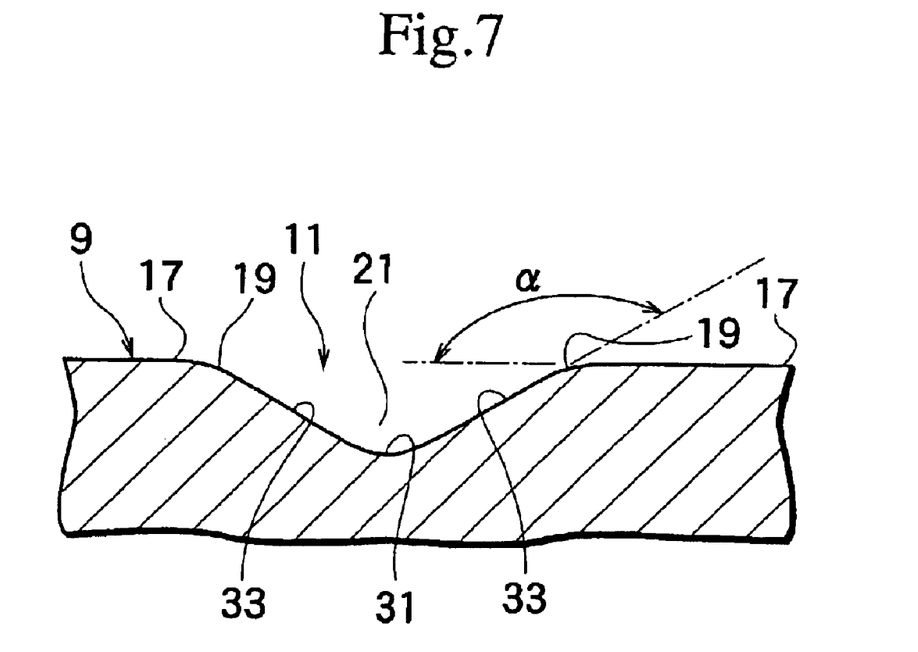
FIG. 7 is a sectional view taken along a line SC—SC of FIG. 4.

A wet-type friction clutch plate according to an embodiment of the present invention will be explained with reference to FIGS. 1 to 7 in which FIG. 1 is a front view showing the clutch plate, FIG. 2 is a sectional view taken along a line SA—SA of FIG. 1, FIG. 3 is an enlarged view partly showing a frictional slide face of the clutch plate, FIG. 4 is an enlarged view showing a groove intersection on the frictional slide face of FIG. 3, FIG. 5 is a sectional view taken along a line SB—SB of FIG. 3, FIG. 6A is an enlarged sectional view showing a groove of FIG. 5, FIG. 6B is an enlarged sectional view showing a groove according to a modification of FIG. 6A, and FIG. 7 is a sectional view taken along a line SC—SC of FIG. 4.

In FIGS. 1 and 2, the wet-type friction clutch plate 1 has an annular shape, is made of, for example, carbon tool steel, and is processed by surface treatment. The clutch plate 1 has dimensions of, for example, about 48 mm in inner diameter, about 82 mm in outer diameter, and 0.8 mm in thickness (t). These dimensions may optionally be set.

The clutch plate 1 has a circumferential face 3 and an inner face provided with internal splines that engage with external splines formed on a rotary member. Windows 7 are formed in an intermediate area between the circumferential and inner faces of the clutch plate 1 at predetermined intervals. According to the embodiment, there are six windows 7 each having an arc shape. When the clutch plate 1 is employed for an electromagnetic clutch of a power transmission device, the windows 7 form air gaps to secure magnetic lines of force between electromagnetic coils and armatures.

The clutch plate 1 has, on each surface, a frictional slide face 9 on which a grid of grooves 11 is formed to keep lubricant. In FIG. 3, the grooves 11 include parallel grooves 13 and parallel grooves 15 that are orthogonal to the grooves 13. The grooves 13 and 15 define square sections 17 serving as frictional slide areas each having four corners 19. In FIG. 4, each corner 19 is rounded. Namely, each intersection 21 of the grooves 13 and 15 has rounded corners. Compared with an intersection having sharp corners, the intersection 21 with rounded corners involves a wider area to properly keep lubricant. When the clutch plate 1 is rotated, the intersections 21 supply lubricant onto the sections 17 of the frictional slide face 9.

The grooves 13 and 15 have the same width, depth, and pitch. The grooves 11 will be explained in detail with reference to the grooves 13 shown in FIGS. 5 and 6A. The grooves 13 are formed at fixed pitches of P. According to the embodiment, the pitch P is about 0.3 mm. The groove 13 has a wedge-shaped cross section. According to the embodiment, side walls 23 of the groove 13 are symmetrically inclined to form a V-shape. The width B of the groove 13 is about 0.04 mm. The groove 13 has a rounded bottom 25. Lubricant in the groove 13 may easily rise along the side walls 23 due to the rounded bottom 25 and move onto the frictional slide face 9.

The depth H of the groove 13 is 0.004 mm according to the embodiment. The depth may be deeper than 0.004 mm.

Due to the V-shaped cross section of the groove 13, an angle θ between each side wall 23 and the section 17 is an obtuse angle. In a cross section of the groove 13, each side wall 23 is connected to the section 17 through a curve 27. If this part is a sharp edge instead of the curve 27, it may damage a frictional slide face of an opposite clutch plate that engages with the frictional slide face 9 of the clutch plate 1. The curve 27 prevents such damage.

The obtuse angle θ between the side wall 23 and the section 17 makes the curve 27 gentler to prevent the damage of an opposite clutch plate. The gentle curve 27 smoothly passes lubricant between the groove 13 and the section 17.

FIG. 6B shows a modification of the groove 13 (15). The groove 13A of FIG. 6B has a flat bottom 25A. The flat bottom 25A is connected to each side wall 23 through a curve 29. The depth H of the groove 13A may be the same as that of the groove 13, i.e., 0.004 mm. In this case, the width B1 of the groove 13A will be greater than the width B of FIG. 6A.

As a result, the groove 13A can hold more lubricant than the groove 13.

FIG. 7 is a diagonal cross section showing one of the intersections 21 of the grooves 13 and 15. The intersection 21 has a bottom 31 and ridges 33. The bottom 31 is rounded, and the ridges 33 are rounded toward the grooves 13 and 15 in a plan view. The ridge 33 inclines gentler than the side wall 23 of FIG. 6A. The ridge 33 forms an angle α with respect to the section 17 of the frictional slide face 9. The angle α is an obtuse angle that is greater than the angle θ of FIG. 6A. The corner 19 between the ridge 33 and the section 17 is entirely rounded. Namely, a part between a side wall (ridge 33) of the intersection 21 and the section 17 forms a curve.

As a result, the intersections 21 smoothly pass lubricant to and from the sections 17 of the frictional slide face 9. Lubricant also smoothly moves between the intersections 21 and the grooves 13 and 15. The rounded corners 19 hardly damage the surface of an opposite clutch plate. In addition, the rounded corners 19 smoothly pass lubricant between the intersections 21 and the sections 17.

According to the embodiment, a grid of the grooves 11 is formed by pressing the frictional slide face 9 such that the depth H of the grooves 11 is 0.004 mm in an intermediate area on the frictional slide face 9. The intermediate area is encircled with a dot-and-dash line in FIG. 1 between the circumferential face 3 and the inner face where the splines 5 are present. When the grooves 11 are formed by pressing, the depth of the grooves 11 becomes shallower in the above-mentioned intermediate area because material in the intermediate area hardly escapes when pressed compared with material in the inner and outer areas of the clutch plate 1. Accordingly, the embodiment sets the depth of the grooves 11 in the intermediate area to 0.004 mm or deeper when forming the grooves 11 by pressing.

When the clutch plate 1 is pressed to form the grooves 11, material outside the intermediate area is stretched and material inside the intermediate area is compressed, and therefore, the material inside the intermediate area more hardly escapes. In addition, a die used to press the grooves 11 may have a peripheral deflection. As a result, the depth of the pressed grooves 11 may be shallowest in a hatched part F in the intermediate area of FIG. 1. Accordingly, the embodiment may set the depth of the grooves 11 in the hatched part F to 0.004 mm when pressing the grooves 11. Then, the depth of any groove 11 on the frictional slide face 9 will be 0.004 mm or deeper. Controlling the depth of the grooves 11 to be pressed in such a way secures a depth of 0.004 mm for every groove 11 formed on the frictional slide face 9.

The grooves 11 will have a uniform depth if a shallow-groove die is employed on inner and outer parts of the clutch plate 1. In this case, the depth of the grooves 11 is controlled at an optional location in the inner and outer parts of the clutch plate 1.

The clutch plate 1 may be formed with an optional technique. One technique forms grooves on a plate material by pressing and then punches the plate material into the clutch plate 1. Another technique punches a plate material into the clutch plate 1 and then forms grooves on the clutch plate 1.

The shallow-groove die mentioned above has a flat press face with protrusions to form grooves and is used to entirely press a plate material. Each protrusion on the die is connected to the flat press face through a curve to form rounded groove edges on the plate material. Such a die is capable of forming grooves having a uniform depth and required surface conditions (rounded groove edges, a specified roughness, and the like) on a frictional slide face of a clutch plate.

A die having protrusions whose height is greater than the depth of grooves to be formed is also employable. When the die is pressed to the surface of a plate material, grooves are formed on the plate material, and at the same time, material on each side of each protrusion is pulled into the corresponding grooves. This results in forming rounded groove edges.

In the use of the wet-type friction clutch plate 1 of FIG. 1, the frictional slide face 9 is frictionally engaged with the surface of an opposite clutch plate, to transmit torque between rotary members that are attached to the clutch plates, respectively, and rotate relative to each other. The opposite clutch plate may be a flat clutch plate or a clutch plate having a frictional slide face on which radial grooves, concentric grooves, spiral grooves, or sunburst grooves are formed. The opposite clutch plate to be engaged with the clutch plate 1 of the present invention is optional and is not limited to a specific one.

When transmitting torque, the grooves 11 keep lubricant to reduce friction on the clutch plate 1 and improve the durability of the clutch plate 1. The grooves 11 are formed at predetermined pitches, and the depth of the grooves 11 is set to 0.004 mm or deeper to stabilize torque transmission and prevent shuddering noise.

Figure 8:
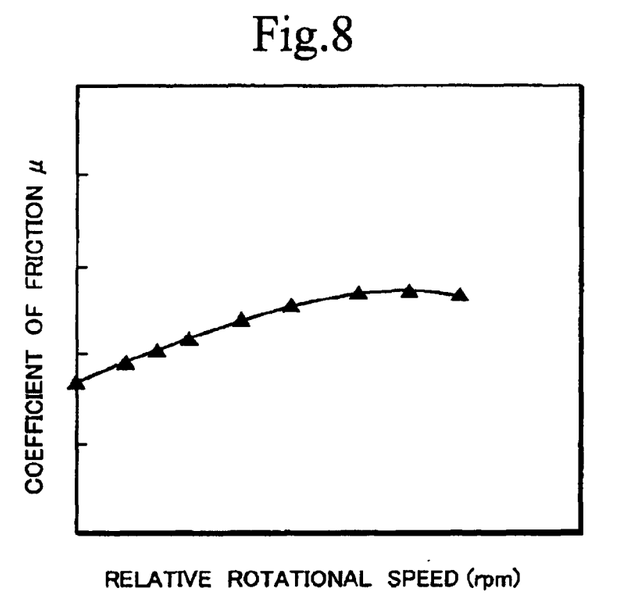
FIG. 8 is a graph showing a μ-v characteristic of a wet-type friction clutch plate according to an embodiment of the present invention.
Figure 9:
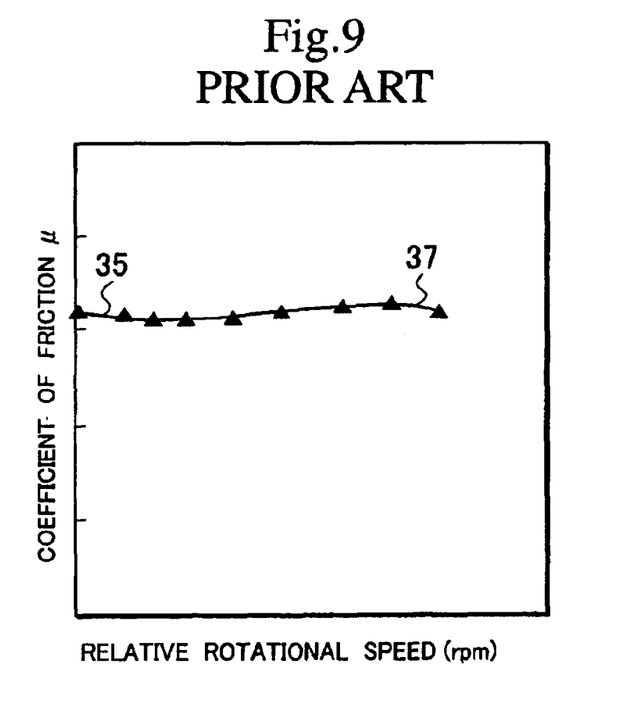
FIG. 9 is a graph showing a μ-v characteristic of a clutch plate according to a related art.

FIG. 8 is a graph showing the $\mu$-v characteristic of a wet-type friction clutch plate according to an embodiment of the embodiment and FIG. 9 is a graph showing the $\mu$-v characteristic of a clutch plate according to a related art. In the graphs, an abscissa indicates a relative rotational speed (rpm) of the clutch plate relative to an opposite clutch plate and an ordinate indicates coefficient of friction ($\mu$) on a frictional slide face of the clutch plate.

In FIG. 8, the depth of grooves formed on a frictional slide face of the clutch plate is 0.004 mm, and in FIG. 9, the groove depth is shallower than 0.004 mm.

According to the embodiment of FIG. 8 with the groove depth of 0.004 mm, the $\mu$-v characteristic shows a positive $\mu$-v inclination in which the coefficient of friction increases with an increase in the relative rotational speed. On the other hand, the related art of FIG. 9 with the groove depth of less than 0.004 mm shows a negative $\mu$-v inclination at a low-speed point 35 and a high-speed point 37 where the coefficient of friction decreases with an increase in the relative rotational speed.

The related art of FIG. 9 indicates that a groove depth shallower than 0.004 mm causes self-excited vibration, destabilizes torque transmission, and produces shuddering noise when the clutch plate frictionally engages with an opposite clutch plate. On the other hand, the embodiment of FIG. 8 indicates that the groove depth of 0.004 mm provides a positive $\mu$-v inclination to prevent self-excited vibration, stabilize torque transmission, and suppress shuddering noise.

According to the embodiment of FIG. 1, each groove 11 has a V-shaped cross section with the side walls 23 symmetrically inclining. When the clutch plate 1 is disengaged, lubricant enters the grooves 11 and a wedge action of the V-shaped cross sections generates fluid pressure to smoothly move the lubricant from the grooves 11 onto the frictional slide face 9 and increase a lubricant film thickness between the clutch plate 1 and an opposite clutch plate. This results in reducing a time lag in a clutch residual torque diminishing period.

The symmetrical V-shape formed with the side walls 23 in each groove 11 ensures the same effect on each side wall 23.

The grooves 11 include grooves oriented in a rotational direction of the clutch plate 1 and grooves oriented in a direction orthogonal to the rotational direction. If the grooves orthogonal to the rotation direction have sharp edges, they will damage a frictional slide face of an opposite clutch plate. The grooves 11 each provided with a V-shaped cross section easily form an obtuse angle θ between each side wall 23 and the frictional slide face 9, to avoid sharp groove edges and prevent the damage of a frictional slide face of an opposite clutch plate.

In a cross section of the groove 11, each side wall 23 is connected to the frictional slide face 9 through the curve 27 to prevent the damage of a frictional slide face of an opposite clutch plate, keep sufficient lubricant, maintain a uniform lubricant film thickness, and avoid a stick-slip phenomenon.

The curves 27 of the grooves 11 prevent the damage of groove edges (curves 27) during a surface hardening process that employs, for example, a polishing process such as shot peening or shot blasting or barrel polishing to remove an oxide film from the frictional slide face 9. The barrel polishing has a little surface hardening operation, however, enables to remove an oxide film from the frictional slide face 9 as effectively as shot peening and shot blasting.

The curves 27 of the grooves 11 prevent the warp of groove edges and the damage of groove edges during a surface hardening process that employs a heating process or a coating process. The heating process is a process which has effect of improving the hardness and wear-proof characteristic of the frictional slide face 9 after processing at least. The heating process may optionally employ, for example, induction hardening, laser hardening, flame hardening, dissociation hardening, carburizing. The heating process may also employ, for example, nitriding such as brinitriding, chlorinitriding, soft nitriding, oxynitriding, carbonitriding, or sulfonitrizing. The coating process is a process to form a hardening film made of, for example, carbide or nitride or boride or metal on the frictional slide face 9.

In addition, the surface hardening process may optionally employ tuftriding or nitrotec or radical nitriding. Tuftriding and nitrotec are easily process and facilitate to set conditions to obtain the desired hardness of the frictional slide face 9. The radical nitriding has an effect of preventing to vary a precision and smoothness, and obtaining high-hardness, and forming non-oxidation condition of the frictional slide face 9 after processing. Therefore, when the frictional slide face 9 is processed by the radical nitriding, the clutch plate 1 serves as a good electromagnetic friction clutch.

Each intersection 21 of the grooves 11 is provided with a cross section having a curve between each side wall (ridge 33) of the intersection and the frictional slide face 9. This prevents the damage of a frictional slide face of an opposite clutch plate, smoothly passes lubricant, maintains a uniform lubricant film thickness, and suppresses a stick-slip phenomenon.

The curves at the intersections 21 prevent the damage of edges (corners 19) at the intersections 21 during a surface hardening process to remove an oxide film.

The rounded corners 19 of each intersection 21 of the grooves 11 widen the area of the intersection 21 and sufficiently maintain lubricant at the intersection 21.

The depth of the grooves 11 is set to be within a range of 0.004 mm to 0.03 mm, to secure lubrication on the frictional slide face 9.

Fine pitches and fine frictional slide areas (sections 17) are secured among the grooves 11, to smoothly transmit torque through frictional engagement and prevent shuddering noise.

When applied to an electromagnetic friction clutch (to be explained later) employing a pilot clutch (45) that achieves frictional engagement due to electrically controlled electromagnetic force, the grooves 11 shallower than 0.03 mm on the pilot clutch (45) secure magnetic lines of force to provide a required electromagnetic force. If the grooves are too deep, they increase spaces between the clutch plates, to block magnetic lines of force. On the other hand, the grooves 11 shallower than 0.03 mm stabilize magnetic attraction and realize sufficient frictional engagement.

The grooves 11 having wedge- or V-shaped cross sections of fixed opening angles reduce sections 17 as the depth of the grooves 11 becomes deeper. The grooves 11 shallower than 0.03 mm maintain proper frictional slide sections (areas) on the frictional slide face 9 to secure proper frictional engagement.

The grooves 11 are formed on the frictional slide face 9 by pressing such that the depth of the grooves 11 is in a range of 0.004 mm to 0.03 mm in a radially intermediate area on the frictional slide face 9. At the location where the grooves 11 tend to become shallower during pressing, the depth of the grooves 11 is surely within the range of 0.004 mm to 0.03 mm. As a result, all grooves 11 on the frictional slide face 9 secure the depth of 0.004 mm to 0.03 mm. The depth of the grooves 11 is surely and easily managed.

Figure 10:
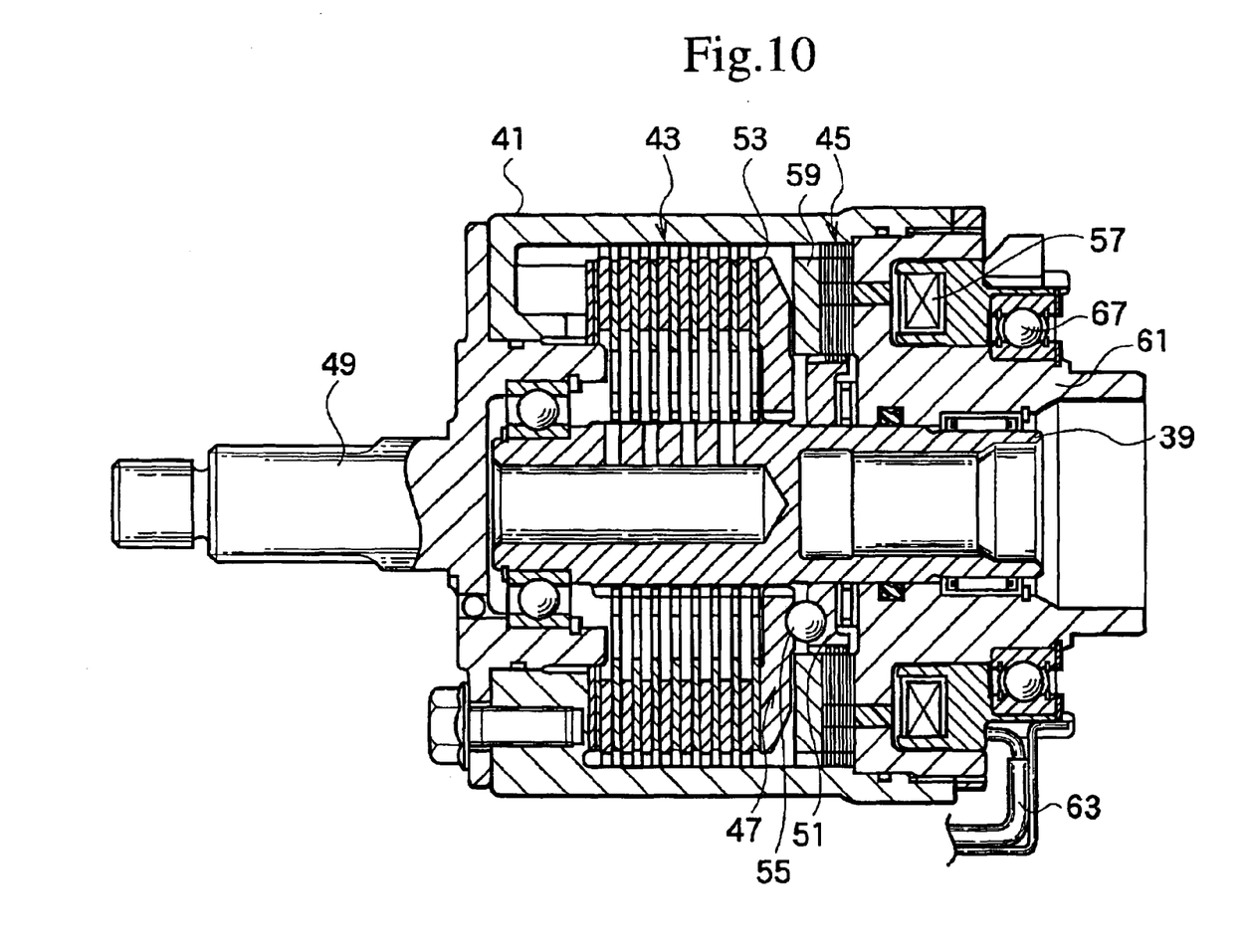
FIG. 10 is a sectional view showing an electromagnetic friction clutch employing wet-type friction clutch plates according to an embodiment of the present invention.

FIG. 10 is a sectional view showing an electromagnetic friction clutch employing the wet-type friction clutch plate 1 of the present invention. The clutch of FIG. 10 includes an inner rotary member 39 and an outer rotary member 41. The inner and outer rotary members 39 and 41 are arranged on the same axis and are rotatable relative to each other. A space between the inner and outer rotary members 39 and 41 is filled with lubricant and accommodates a main clutch 43, a pilot clutch 45, and a cam mechanism serving as a converter 47. The clutches and converter are electrically controlled to transmit torque between the inner and outer rotary members 39 and 41.

The inner rotary member 39 is made of a shaft material and is joined to, for example, a drive pinion shaft serving as an input shaft of a rear differential. The outer rotary member 41 is made of a rotary casing whose end is solidly connected to a joint shaft 49, which is connected to, for example, a constant-velocity joint on a propeller shaft.

The main clutch 43 includes friction plates alternately connected to the inner and outer rotary members 39 and 41. The pilot clutch 45 includes friction plates alternately connected to a cam plate 51 of the converter 47 and the outer rotary member 41.

The converter 47 includes the cam plate 51, a pressure plate 53, and a steel ball 55 arranged between cam faces formed on the cam plate 51 and pressure plate 53.

The cam plate 51 is rotatable relative to a peripheral face of the inner rotary member 39. A peripheral face of the cam plate 51 has splines that engage with the corresponding friction plates of the pilot clutch 45. An inner circumferential face of the pressure plate 53 has splines that engage with the inner rotary member 39. An outer face of the pressure plate 53 axially faces an end friction plate of the main clutch 43.

The pilot clutch 45 engages when an electromagnet 57 attracts an armature 59. The electromagnet 57 is rotatable relative to the outer rotary member 41 through a bearing 67 and is supported by an end plate 61 arranged between the inner and outer rotary members 39 and 41. The electromagnet 57 is connected to a controller through a lead 63.

When energized by the controller, the electromagnet 57 attracts the armature 59 to engage the pilot clutch 45. If the outer rotary member 41 transmits torque at this time, the inner and outer rotary members 39 and 41 rotate relative to each other. Then, the cam plate 51 tries to rotate with the outer rotary member 41 through the pilot clutch 45, and the pressure plate 53 tries to rotate with the inner rotary member 39. As a result, the cam plate 51 and pressure plate 53 rotate relative to each other, to move the pressure plate 53 toward the main clutch 43 due to a cam action caused by the steel ball 55 and cam faces. The movement of the pressure plate 53 engages the main clutch 43, to transmit torque from the outer rotary member 41 to the inner rotary member 39 through the main clutch 43.

Torque transmission by the main clutch 43 is optionally controllable by electrically controlling the electromagnet 57 through the controller. Namely, torque transmission by the main clutch 43 is electrically controllable according to an accelerator opening or various vehicle sensors.

According to an embodiment of the present invention, transmission torque of the main clutch 43 is maximum irrespective of an accelerator opening if a 4WD mode of a vehicle in which the clutch of FIG. 10 is installed is locked to a 4WD state. If the 4WD mode is in an automatic state, an optimum driving state will be achieved by properly controlling a current to the electromagnet 57 according to a driving condition such as a start, high-speed run, or low-speed run condition. In a low-speed turn condition, the clutch may reduce torque distribution to the rear wheels, to suppress a tight corner braking phenomenon. If the 4WD mode is switched to a 2WD mode, torque on the main clutch 43 is set to 0 Nm to realize a 2WD state with the front wheels. If the vehicle is of a front-engine, rear-drive type, the 2WD state is achieved with the rear wheels.

At least one of the pilot clutch 45 and main clutch 43 may employ the wet-type friction clutch plates 1 of the present invention.

When the pilot clutch 45 employs the clutch plates 1, the pilot clutch 45 realizes a good transient characteristic of torque transmission in response to current ON/OFF operations and minimizes magnetic flux variations under a predetermined current value. The grooves 11 on the clutch plates 1 block magnetic lines of force at a current OFF operation.

When the main clutch 43 employs the clutch plates 1, the main clutch 43 improves response to a change in transmitted torque or a change in a torque transmission direction. Namely, the main clutch 43 improves torque transmission response with respect to engagement of the pilot clutch 45 that is changed by controlling a current. The main clutch 43 also improves torque transmission OFF response when a control current to the pilot clutch 45 is cut. In addition, shuddering noise in the main clutch 43 is minimized.

When the clutch plate 1 is employed for the main clutch, the clutch plate 1 may be provided with a facing material made of paper or carbon, and the grooves 11 of the present invention may be formed on the facing material.

Although the depth of the grooves 11 is 0.004 mm in the embodiment, the depth may be selected from the range of 0.004 mm to 0.03 mm. The pitches P of the grooves 11 are preferable to be in a range of 0.2 mm to 0.9 mm, and the width B of the grooves 11 is preferable to be in a range of 0.02 mm to 0.1 mm. The thickness t of the clutch plate 1 is preferable to be in a range of 0.7 mm to 1.0 mm.

What is claimed is:

1. A wet-type friction clutch plate comprising:
   a grid of grooves formed on a frictional slide face that frictionally engages with an opposite clutch plate, the grooves including a plurality of first grooves and a plurality of second grooves that intersect with the plurality of first grooves,
   at least one of the sectional shape and plan shape of each of the first and second grooves being configured to provide the frictional slide face with a $\mu$-v characteristic such that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate.

2. The wet-type friction clutch plate of claim 1, wherein the first and second grooves each have a wedge-shaped cross section.

3. The wet-type friction clutch plate of claim 2, wherein the first and second grooves each have a V-shaped cross section having symmetrically inclined side walls.

4. The wet-type friction clutch plate of claim 1, wherein the first and second grooves each have side walls and a cross section having a curve between each side wall and the frictional slide face.

5. The wet-type friction clutch plate of claim 2, wherein the first and second grooves each have side walls and a cross section having a curve between each side wall and the frictional slide face.

6. The wet-type friction clutch plate of claim 3, wherein the first and second grooves each have a cross section having a curve between each side wall and the frictional slide face.

7. An wet-type friction clutch plate comprising:
   a grid of grooves having a plurality of intersections formed on a frictional slide face that frictionally engages with an opposite clutch plate,
   at least one of the sectional shape and plan shape of each of the grooves being configured to provide the frictional slide face with a $\mu$-v characteristic such that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate,
   each intersection of the grooves having a cross section having side walls and a curve between each side wall of the intersection and the frictional slide face.

8. The wet-type friction clutch plate of claim 7, wherein the grooves each have a wedge-shaped cross section.

9. The wet-type friction clutch plate of claim 7, wherein the grooves each have a V-shaped cross section having symmetrically inclined side walls.

10. A wet-type friction clutch plate comprising:
    a grid of grooves having a plurality of intersections formed on a frictional slide face that frictionally engages with an opposite clutch plate,
    at least one of the sectional shape and plan shape of each of the grooves being configured to provide the frictional slide face with a $\mu$-v characteristic such that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate,
    each intersection of the grooves having rounded corners in a plan view to widen the area of the intersection.

11. The wet-type friction clutch plate of claim 10, wherein the grooves each have a wedge-shaped cross section.

12. The wet-type friction clutch plate of claim 10, wherein the grooves each have a V-shaped cross section having symmetrically inclined side walls.

13. A wet-type friction clutch plate comprising:
    a grid of grooves having a plurality of intersections formed on a frictional slide face that frictionally engages with an opposite clutch plate,
    at least one of the sectional shape and elan shape of each of the grooves being configured to provide the frictional slide face with a $\mu$-v characteristic such that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate,
    the depth of the grooves being in a range of 0.004 mm to 0.03 mm.

14. The wet-type friction clutch plate of claim 13, wherein the grooves each have a wedge-shaped cross section.

15. The wet-type friction clutch plate of claim 13 wherein the grooves each have a V-shaped cross section having symmetrically inclined side walls.

16. A wet-type friction clutch plate comprising:
    a grid of grooves formed on a frictional slide face that frictionally engages with an opposite clutch plate,
    at least one of the sectional share and plan shape of each of the grooves being configured to provide the frictional slide face with a $\mu$-v characteristic such that $\mu$ increases with an increase in v to prevent self-excited vibration during frictional engagement of the wet-type friction clutch plate with the opposite clutch plate, wherein $\mu$ is a coefficient of friction on the frictional slide face and v is a relative rotational speed of the wet-type friction clutch plate relative to the opposite clutch plate,
    the grooves being formed by pressing the frictional slide face with the depth of the grooves being in a range of 0.004 mm to 0.03 mm in a radially intermediate area on the frictional slide face.

17. The wet-type friction clutch plate of claim 16, wherein the grooves each have a wedge-shaped cross section.

18. The wet-type friction clutch plate of claim 16, wherein the grooves each have a V-shaped cross section having symmetrically inclined side walls.

19. An electromagnetic friction clutch comprising:

inner and outer rotary members coaxially arranged to rotate relative to each other;

a main clutch interposed between the inner and outer rotary members and arranged to increase and decrease frictional engagement in response to axial thrust and transmit torque between the inner and outer rotary members through the frictional engagement when the inner and outer rotary members rotate relative to each other;

a pilot clutch arranged to achieve frictional engagement in response to electrically controlled electromagnetic force; and a converter acting on the frictional engagement of the pilot clutch and arranged to convert the frictional engagement into thrust to the main clutch, the wet-type friction clutch plate of any one of claims 1, 7, 10, 13 or 16 being employed by at least one of the main clutch and pilot clutch.

20. The wet-type friction clutch plate of claim 1, wherein the first grooves are parallel to one another and the second grooves are parallel to one another.

21. The wet-type friction clutch plate of claim 20, wherein the first grooves are perpendicular to the second grooves.

22. The wet-type friction clutch plate of claim 1, wherein the first grooves are oriented in a rotational direction of the clutch plate and the second grooves are oriented in a direction perpendicular to the rotational direction.

* * * * *